United States Patent
Alperovich et al.

(10) Patent No.: US 6,505,051 B1
(45) Date of Patent: Jan. 7, 2003

(54) SYSTEM FOR REAL TIME NOTIFICATION OF SUBSCRIBER SERVICE CHANGES USING MESSAGING SYSTEMS

(75) Inventors: Vladimir Alperovich, Dallas, TX (US); Walt Evanyk, Dallas, TX (US)

(73) Assignee: Ericsson, Inc., Richardson, TX (US)

( * ) Notice: Subject to any disclaimer, the term of this patent is extended or adjusted under 35 U.S.C. 154(b) by 0 days.

(21) Appl. No.: 09/464,094

(22) Filed: Dec. 16, 1999

(51) Int. Cl.$^7$ ................................................. H04Q 7/20
(52) U.S. Cl. ..................................... 455/466; 455/414
(58) Field of Search ................................ 455/414, 412, 455/418, 419, 466, 564, 566, 9, 567, 7, 8, 435, 433

(56) References Cited

U.S. PATENT DOCUMENTS

| | | | | |
|---|---|---|---|---|
| 5,315,634 A | * | 5/1994 | Tanaka et al. | 379/93.02 |
| 5,577,103 A | * | 11/1996 | Foti | 455/412 |
| 5,613,213 A | * | 3/1997 | Naddell et al. | 455/154.2 |
| 5,784,693 A | * | 7/1998 | Barber et al. | 455/434 |
| 5,915,214 A | * | 6/1999 | Reece et al. | 379/114.01 |
| 6,055,442 A | * | 4/2000 | Dietrich | 455/419 |
| 6,101,387 A | * | 8/2000 | Granberg et al. | 455/414 |
| 6,122,503 A | * | 9/2000 | Daly | 455/419 |
| 6,301,484 B1 | * | 10/2001 | Rogers et al. | 455/186.1 |

OTHER PUBLICATIONS

Digital cellular telecommunications system (Phase 2+); Technical realization of the Short Message Service (SMS); Point–to–Point (PP) (GSM 03.40 version 7.1.0 Release 1998) (European Telecommunications Standards Institute).

* cited by examiner

Primary Examiner—Dwayne Bost
Assistant Examiner—Lewis West
(74) Attorney, Agent, or Firm—Gardere Wynne Sewell LLP; Sanford E. Warren; Ronald Burns

(57) ABSTRACT

A system implementing automatic subscriber notification over a wireless telecommunications network and providing immediate subscriber notice of changes made to an individual subscriber profile is disclosed; comprising a messaging service (122) communicatively linking an operational facility (102) within the wireless telecommunications network and a subscriber unit (108), a structure (110) accessible by the facility and storing therein service profile data (118) associated with the subscriber unit, and a notification protocol system (314), communicatively linked with the structure and with the messaging service, monitoring the service profile data, generating a notification message (318) responsive to any change in the service profile data, and transmitting the notification message to the subscriber unit via the messaging service.

18 Claims, 3 Drawing Sheets

SYSTEM FOR REAL TIME NOTIFICATION OF SUBSCRIBER SERVICE CHANGES USING MESSAGING SYSTEMS

TECHNICAL FIELD OF THE INVENTION

The present invention relates generally to subscriber messaging systems within wireless telecommunications networks and, in particular, to a system for automatically notifying, on a real-time basis, a subscriber of any changes made to their telecommunications services or subscriptions.

BACKGROUND

Services and features available to mobile telecommunications subscribers are constantly changing and increasing. Protocols and systems have been developed to provide features and functionality beyond basic phone service. One such feature that is incorporated into, but underutilized by, many mobile telecommunications systems is subscriber messaging. For example, GSM (Global System for Mobile communications) cellular systems typically incorporate Short Message Service (SMS). SMS provides a system by which alpha-numeric text messages (up to 160 characters) may be sent to a mobile subscriber (i.e. mobile phone). With appropriate support systems, a subscriber may thus receive text messages in addition to, or in lieu of, a phone call.

Despite a variety of available convenience features such as SMS, conventional mobile telecommunications systems fail to provide subscribers with real-time notification of changes to their services and subscriptions; especially where those changes are not directly initiated by a subscriber. This results in a number of problems not only for subscribers, but also for mobile telecommunications providers, particularly from a customer satisfaction perspective.

Consider, for example, long distance provider service and instances of "slamming". Typically, a mobile subscriber elects a preferred long distance carrier to use in conjunction with their cellular service. All long distance calls and roaming call extensions will be handled by this carrier. Presently, subscribers have no convenient or timely notification of any changes in preferred carrier; and are not aware of the exact date and time when an authorized carrier change occurs. Where long distance service has been changed without subscriber awareness or authorization, a practice commonly referred to as "slamming", a subscriber typically remains unaware of the change until receiving their next billing statement. The result is increased subscriber dissatisfaction and increased costs for both subscriber and provider.

Further lacking from conventional systems is the receipt, using messaging systems such as SMS, of subscriber authorization of for service changes. Conventional systems thus lack a convenient and efficient bi-directional functionality. Such functionality would allow providers to offer, and subscribers to elect or decline, new and improved services directly and immediately via a subscriber's mobile phone.

From the foregoing, it can be appreciated that a need exists for a system automatically providing mobile telecommunications subscribers with immediate notification of changes to their services and subscriptions. It is desirable that such a system provide convenient and efficient bi-directional communication. It is further desirable that such a system use available infrastructure and protocols; cost-effectively providing enhanced subscriber/provider communication and overcoming limitations of conventional methods. It is believed that the system of the present invention described herein solves and addresses these problems and concerns.

SUMMARY OF THE INVENTION

The present invention provides a system of structures and methods for automatic and immediate subscriber notification of changes in that subscriber's mobile communication services and subscriptions. The present invention further provides a system that combines with and utilizes existing messaging service system infrastructure and protocols within mobile telecommunications systems to cost-effectively and efficiently provide this subscriber notification. Notification protocol structure is provided; monitoring subscriber service data, identifying changes in that data, and interfacing with messaging services and systems to communicate those changes to a mobile subscriber.

DETAILED DESCRIPTION

The present invention defines a system, comprising various structures and methods, implementing automatic subscriber notification over a wireless telecommunications network and providing immediate subscriber notice of changes made to an individual subscriber profile. The present invention provides cost effective and efficient communication between a provider and subscriber; expanding and supplementing existing message service capabilities within a given wireless telecommunication network or system.

It should be understood that the principles and applications disclosed herein can be applied to a wide range of wireless telecommunications systems utilizing a variety of standardized or proprietary messaging systems and services. For purposes of explanation and illustration, the present invention is hereafter described in reference to SMS within a GSM telecommunications system. The present invention, however, is equally applicable, for example, in CDMA (code division multiple access) telecommunication systems or using IP (Internet protocol) packetized data, or USSD (unstructured supplementary service data), messaging systems.

Figure 1:
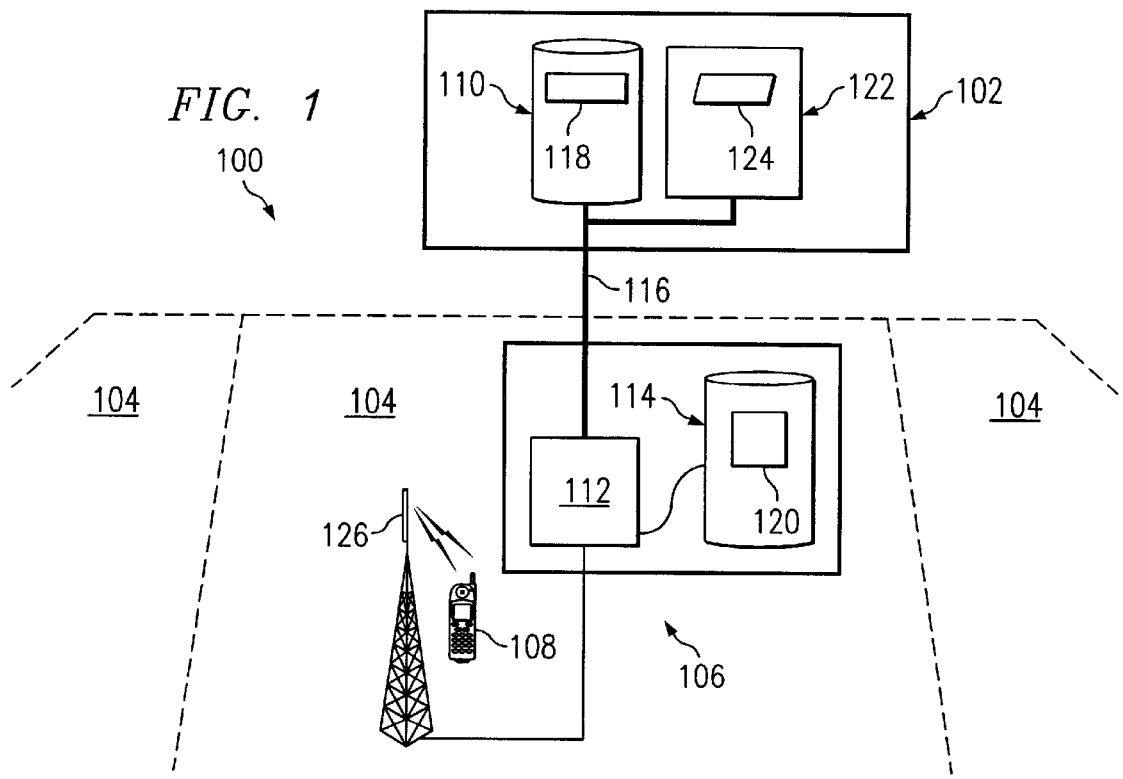
FIG. 1 is an illustrative schematic of a wireless telecommunications system.

Referring now to FIG. 1, an exemplary GSM wireless (or cellular) telecommunications system 100 is depicted. System 100 comprises a central operations facility 102 and a plurality of local coverage areas 104. Each area 104 typically has its own service infrastructure 106 (usually a switching center); which interfaces with facility 102 to provide services to a mobile subscriber unit 108 roaming with the area 104. As a subscriber roams from one area 104 to another, service of unit 108 is handed off between the respective area switching centers 106.

Facility 102 comprises home location register (HLR) 110. HLR 110 is a large data repository; typically a database on a server or other computer structure associated with facility 102. Switching center 106 comprises a mobile switching center (MSC) 112 and a visitor location register (VLR) 114. MSC 112 is remote structure handling communication operations for a given service area 104. A single MSC may be configured to act as MSC 112 for multiple areas 104. As such, service handover between area switching centers 106 may comprise handover between different MSCs or within a single MSC.

Typically, MSC 112 is a database on a server or other computer structure associated with center 106. VLR 114 is structure for storing temporary copies of subscriber data. VLR 114 may also be a database, or any other suitable storage structure meeting system requirements. VLR 114 may be co-located and associated with MSC 112, as shown in FIG. 1, or it may be integrated within MSC 112.

HLR 110 is communicatively coupled to MSC 112 by signaling link 116. Link 116 may be any desired communications link; such as, in this example, an SS-7 trunk or, alternatively, some other data channel such as an IP network.

In cellular system 100, all data associated with a particular subscriber unit 108 (e.g. mobile phone number, rate plan, and long distance carrier information) is stored as a subscriber profile structure 118 in the HLR 110. As a subscriber unit 108 roams into a given MSC service area 104, a temporary copy 120 of that subscriber's profile 118 is downloaded to the VLR 114 in the local switching center 106 handling call traffic for the area. Copy 120 typically expires once unit 108 leaves the given MSC service area 104. The HLR 110 tracks the location of each unit 108 in the system 100; each time a new MSC 112 is utilized, HLR 110 receives a location update.

System 100 further comprises a subscriber messaging service 122. A message 124 is generated from facility 102, transmitted to MSC 112 via link 116, and delivered to unit 108 by MSC 112 via base station antenna 126. A variety of messaging services may be available within a given cellular system, depending on the standards incorporated within that system.

Figure 2:
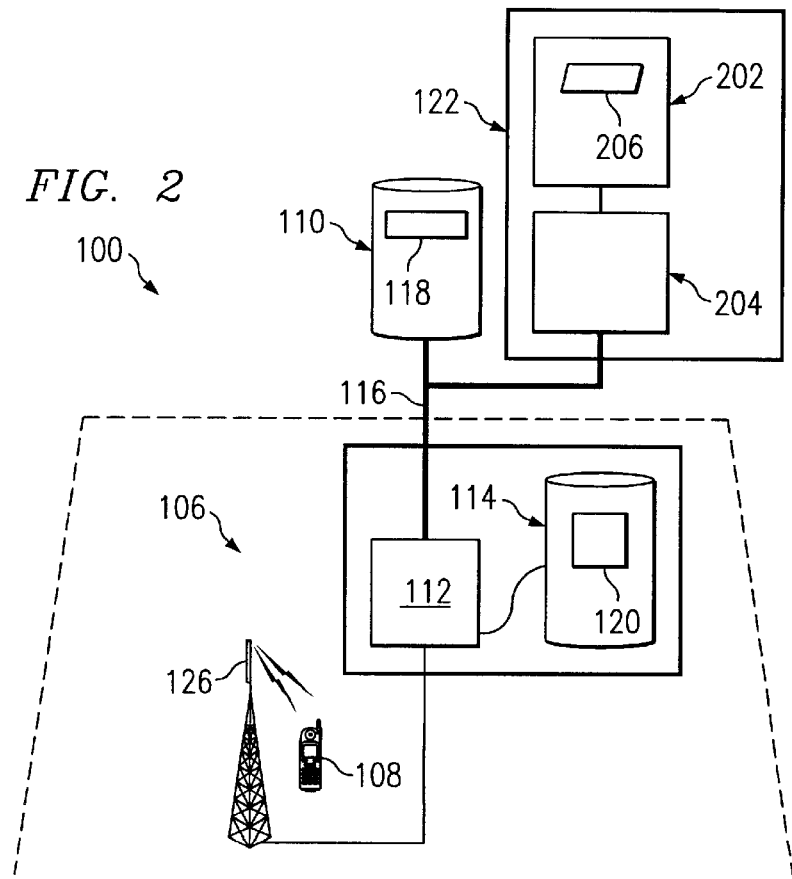
FIG. 2 is an illustrative schematic of an SMS messaging system in conjunction with the system of FIG. 1.

Referring now to FIG. 2, a GSM telecommunications system 200 is depicted with reference to SMS messaging. SMS, which stands for Short Message Service, is defined the GSM 03.40 Technical Specification; which is published by the European Telecommunications Standards Institute and is herein incorporated by reference. Therefore, in system 200, service 122 is SMS based. Service 122 comprises an SMS service center (SC) 202 and SMS gateway (GW) 204. Using SMS service 122, alpha-numeric messages may be sent to mobile unit 108.

In operation, a message 206 is generated and stored in SC 202 and transferred to GW 204. An inquiry to the HLR 110 identifies which MSC 112 the unit 108 is currently associated with, before transmitting message 206 from GW 204 to MSC 112 via link 116, and delivering to unit 108 via antenna 126.

Figure 3:
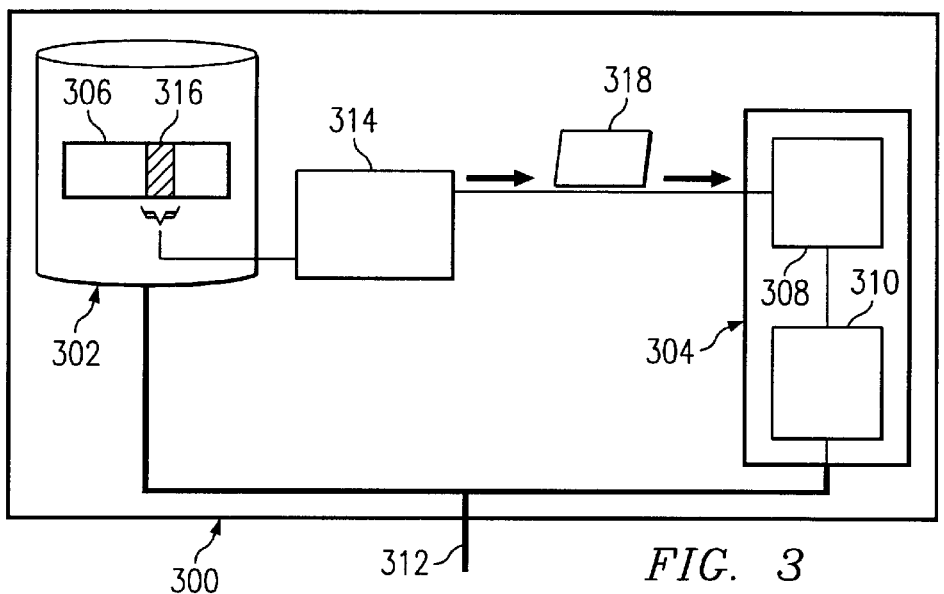
FIG. 3 is an illustrative schematic of one embodiment of a wireless telecommunications system according to the present invention.

Referring now to FIG. 3, the present invention is presented within the context of an SMS based system. A central facility 300 is shown in detail, comprising HLR 302 and SMS message service 304. HLR 302 further comprises subscriber profile 306, while service 304 further comprises the SMS SC 308 and SMS GW 310. Both HLR 302 and service 304 are communicatively coupled to the portions (not shown) of a wireless telecommunications system outside facility 300 by link 312. A notification protocol structure 314 is incorporated in accordance with the present invention. Structure 314 is communicatively interfaced with SC 308, and communicatively associated or linked with profile 306 in HLR 302. In particular, structure 314 is associated with one or more data fields 316 in profile 306.

Figure 4:
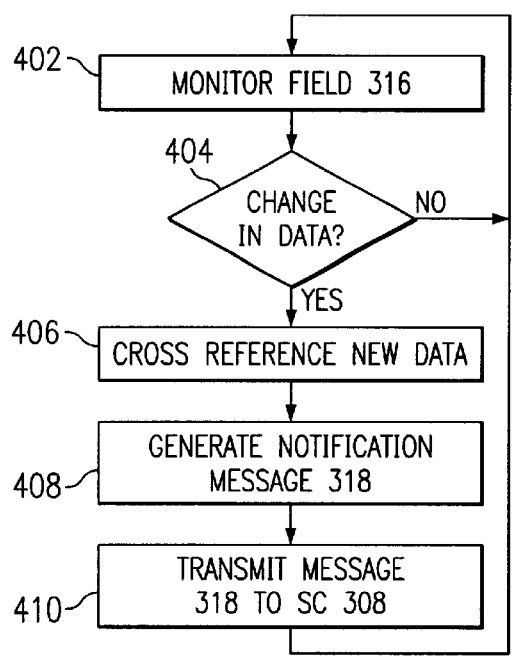
FIG. 4 is a flow diagram illustrating operation in accordance with the present invention of the system of FIG. 3.

Structure 314 operates to monitor data within field 316; generating and sending a notification message 318 via SMS service 304 to a subscriber unit when data within field 316 is changed. FIG. 4 illustrates the operation of structure 314, and reference is now made jointly to FIGS. 3 and 4. Regularly cycling through states 402 and 404, structure 314 monitors a desired user data field 316 for any changes. At state 404, should the data in field 316 change, structure 314 will proceed to state 406. In state 406, structure 314 will evaluate the newly entered data and convert that data to a subscriber-readable text format. This will typically comprise reading a newly entered numeric or code value from field 316, and cross-referencing that value to some subscriber-readable alpha-numeric text. Next, in state 408, structure 314 will combine the cross-referenced new data text with some standard text to form a notification message 318; finally transferring the complete message 318 to the SC 308 in state 410.

It should be apparent to those skilled in the art that structure 314 may be implemented in a number of ways. Structure 314 may comprise software, firmware, hardware, or any desirable combination thereof, depending upon the particular constraints and considerations of a given system. Structure 314 may be implemented as a independent structure, or may be co-located within the same platform as other structures (e.g. HLR) in the system. Structure 314 may comprise one or more operational sub-structures responsible for performing the operations 402–410 detailed in FIG. 4. An exemplary embodiment is now described in reference to FIGS. 5 and 6.

Figure 5:
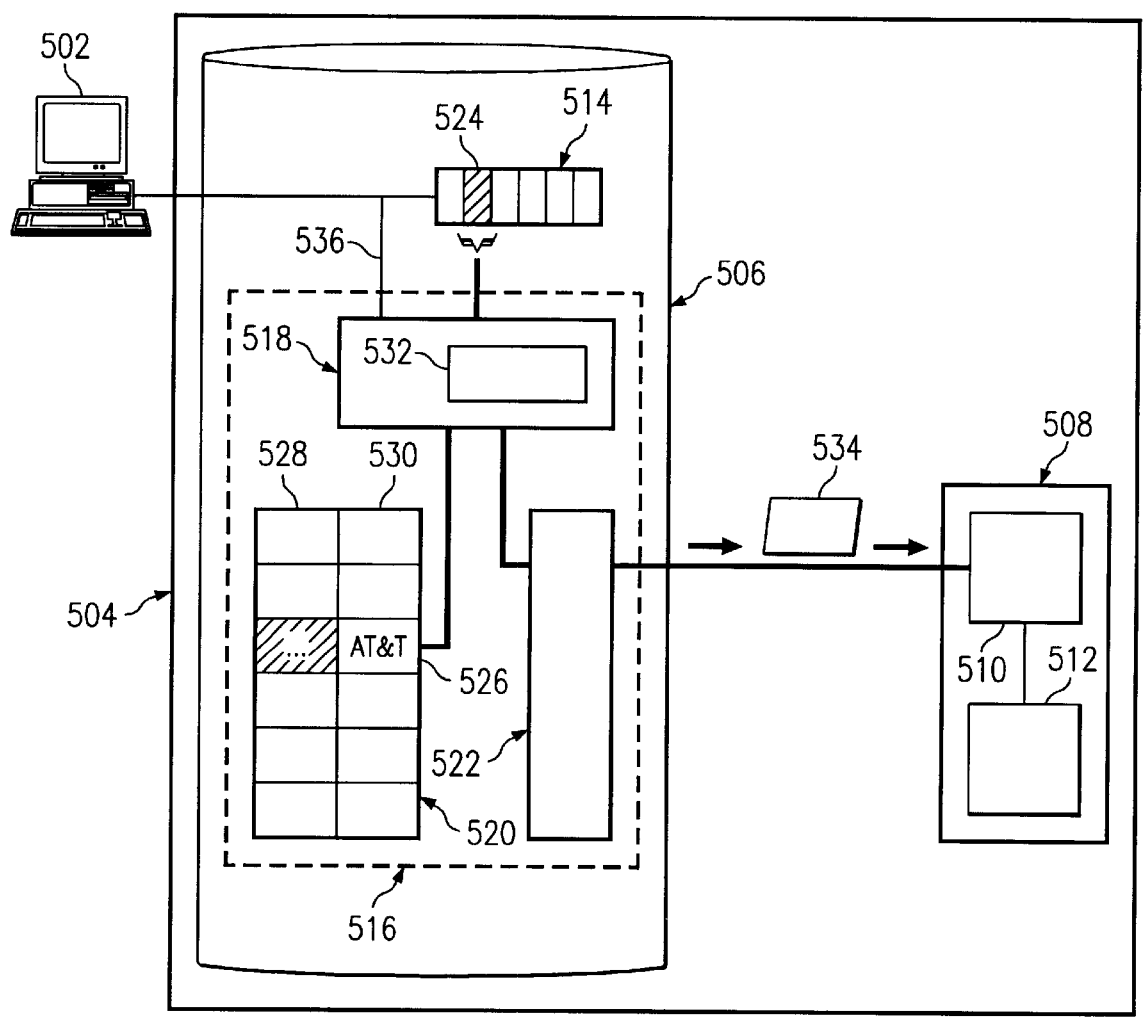
FIG. 5 is an illustrative schematic of one embodiment of a wireless telecommunications system and its operation according to the present invention.

Referring now to FIG. 5, a segment 500 of a wireless telecommunications system according to the present invention is illustrated. Segment 500 comprises an operator terminal 502 and a central facility 504. Facility 504 comprises HLR 506 and SMS service 508. SMS service 508 comprises SC 510 and GW 512. HLR 506 comprises a subscriber profile 514 and notification protocol structure 516. Structure 516 further comprises administration module 518, linked to cross-reference module 520 and to interface module 522. Structure 516 is communicatively linked to monitor data field 524 within profile 514. Structure 516 is further communicatively linked, via module 522, to SC 510. Terminal 502 is communicatively linked to HLR 506, such that terminal 502 may be used to alter data contained within field 524.

For purposes of illustration, field 524 will hereafter be associated with the long distance provider information for profile 514. It should be apparent to those skilled in the art, however, that field 524 may represent any data field or fields within the profile 514; whether pre-selected by a subscriber, user or system designer, or manually selected during operation by a subscriber or user. For example, data field 524 may represent a subscriber's subscription for services such a caller identification, call-waiting, etc. As shown in FIG. 5, the data in field 524 will control connection to a long-distance provider network when the subscriber makes a long-distance call.

Figure 6:
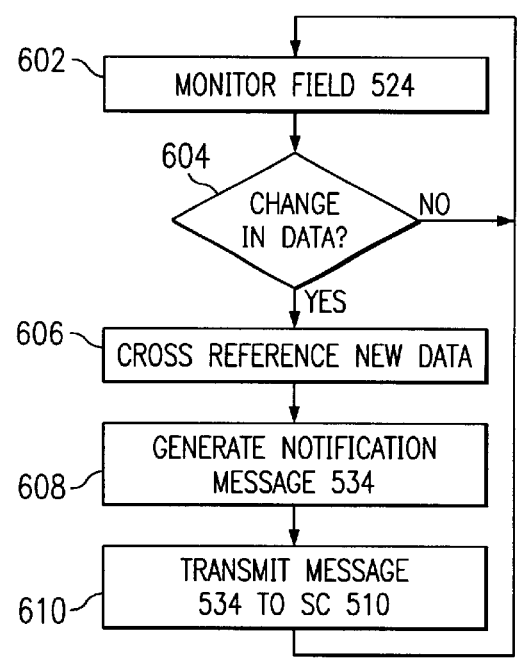
FIG. 6 is a flow diagram illustrating operation in accordance with the present invention of the system of FIG. 5.

Operation of structure 516 is now made in joint reference to FIGS. 5 and 6. Module 518 of structure 516 monitors data field 524, as shown in states 602 and 604, for any change in data (e.g. a change of long distance carrier selection).

Assume, for purposes of illustration, that data field 524 is now altered from a pre-existing code value to 0288 (indicating AT&T) by an operator at terminal 502. Module 518 immediately detects this change and triggers a subscriber notification process, proceeding to state 606. Module 518 reads the newly entered data in field 524, which is generally stored in either some numeric or code format. Module 518 must then cross reference this new data to retrieve a readable text value to include in the notification. Module 518 accesses module 520 to find an entry 526 having a code field 528 that matches the new data in field 524. Once matching entry 526 is identified, module 518 retrieves the text information from corresponding text field 530. Operation transitions to state 608, where module 518 incorporates text field 530 into a standard text message 532 (e.g. "Your long distance provider has changed to . . . ") to produce notification message 534. Module 518 transfers notification 534 to interface 522. Interface module 522 formats notification 534 for use in SMS, and transfers notification 534 to SC 510, as shown in state 610, for delivery to a mobile subscriber unit. A subscriber would thus immediately receive a notification message indicating, in this example, "Your long distance provider has changed to AT&T".

The notification protocol structure of the present invention thus provides a system for automatic and immediate subscriber notification of changes in that subscriber's mobile communication services and subscriptions. A telecommunication service provider could set certain information fields within a subscriber profile for monitoring or, alternatively, a subscriber could be allowed to pre-select which information they would like immediate notification regarding. Further, the present invention utilizes existing messaging service infrastructure and protocols within mobile telecommunications systems; minimizing system overhead and cost associated with implementing the new functionality.

The present invention further provides for bi-directional communication in this notification process; allowing a subscriber to acknowledge receipt of notification or to authorize or reject to change in service. Optionally, module 516 may be adapted to receive, via module 522, an SMS message generated by a subscriber in response to a notification 534 from structure 516. Module 518, communicatively associated with terminal 502 via link 536, receives a subscriber generated return message, and formats a communication for terminal 502 indicating the subscriber's authorization or rejection. An operator at terminal 502 may then restore the prior data, or permanently save the new data in field 524. Alternatively, structure 516 may be adapted to buffer data field 524; restoring the data in field 524 based on a notification rejection, without operator intervention. Changes to the subscriber services could thus be rendered conditional upon subscriber approval.

Another alternative provided by the present invention allows use of SMS messaging to provide notification, as described above, in conjunction with USSD messaging to provide subscriber authorization or rejection. In addition to generating a notification message, the notification protocol system may be designed to trigger a USSD application for the subscriber response. Use of any messaging system or service, or any combination of messaging systems or services, are comprehended by the notification system as taught herein; a variety of topologies and combinations will become apparent to those skilled in the art upon reference to this disclosure.

The present invention thus provides an efficient and cost-effective system for immediate subscriber notification of service changes; operating within, and utilizing existing infrastructure of, a wireless telecommunications network.

What is claimed is:

1. A system providing subscriber notification of service changes within a wireless telecommunications network, the system comprising:
   a message system providing messaging between an operational facility and a subscriber unit communicatively linked to the facility;
   a data structure accessible by the facility, storing a service profile associated with the subscriber unit; and
   a notification protocol system, communicatively linked with the data structure and with the message system, the notification protocol system adapted to monitor the service profile associated with subscriber unit and whenever a subscriber service is changed within the service profile to send a notification message indicating the changed subscriber service to the subscriber unit via the message system.

2. The system of claim 1 wherein the data structure resides within the facility and further comprises a register having therein a data profile structure storing the service profile associated with the subscriber unit.

3. The system of claim 2 wherein the data profile structure further comprises at least one data field, wherein each data field stores data on a particular service associated with the subscriber unit.

4. The system of claim 3 wherein the notification protocol system is adapted to monitor a particular one of the at least one data fields.

5. The system of claim 4 wherein the notification protocol system is adapted to generate and send the notification message responsive to change in the particular one of the at least one data fields.

6. The system of claim 5 wherein the notification protocol system further comprises an administrative module.

7. The system of claim 6 wherein the notification protocol system further comprises a cross-reference module.

8. The system of claim 7 wherein the wireless telecommunications network further comprises a GSM (Global System for Mobile communication) network.

9. The system of claim 8 wherein the message system further comprises an SMS (Short Message Service) protocol.

10. A method of operating a wireless telecommunications system comprising the steps of:
    storing profile data identifying at least one service for a particular subscriber unit within a data storage structure;
    monitoring the profile data for any change in the service; and
    triggering a notification message indicating the changed service to the particular subscriber unit responsive to any change in the service.

11. The method of claim 10 wherein the step of storing profile data further comprises storing the profile data in a home location register, and wherein profile data identifying a particular service is stored within a particular field within the home location register.

12. The method of claim 11 wherein the step of monitoring the profile data for any change in the service further comprises providing a notification module, communicatively linked to the home location register and adapted to signal any change detected in the profile data of a particular service field.

13. The method of claim 12 wherein the step of triggering a notification message further comprises adapting the notification module to include within the notification message information indicating which particular service field and profile data has changed.

14. The method of claim 13 wherein the step of adapting the notification module to include within the notification message information indicating which particular service field and profile data has changed further comprises adapting the notification module to cross reference coded profile data with a text equivalent for inclusion in the notification message.

15. The method of claim 13 wherein the step of triggering a notification message further comprises interfacing the notification module with a message service resident in the wireless telecommunications system to deliver the notification message to the particular subscriber unit.

16. The method of claim 10 further comprising the step of securing a notification response message from the particular subscriber unit.

17. The method of claim 16 wherein any change to the service pends responsive to the notification response message.

18. A method of utilizing infrastructure and protocols present within a wireless telecommunications network to immediately notify a subscriber of changes made in that subscriber's service selections, comprising the steps of:
- providing a messaging service between an operational facility within the wireless telecommunications network and a subscriber unit communicatively linked to the facility;
- providing a data structure accessible by the facility;
- storing within the data structure profile data identifying at least one service associated with the subscriber unit; and
- providing a notification protocol system, communicatively linked with the data structure and with the messaging service, monitoring the profile data, generating a notification message responsive to any change in the service, and transmitting the notification message indicating the changed service to the subscriber unit via the messaging service.

* * * * *